(No Model.) 2 Sheets—Sheet 2.
E. P. HERBERT.
CALCULATING SCALE.
No. 538,676. Patented May 7, 1895.
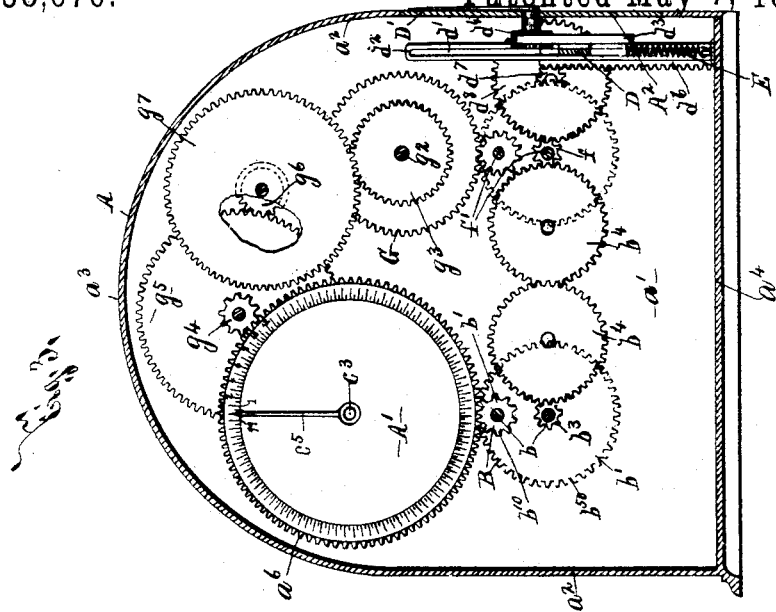
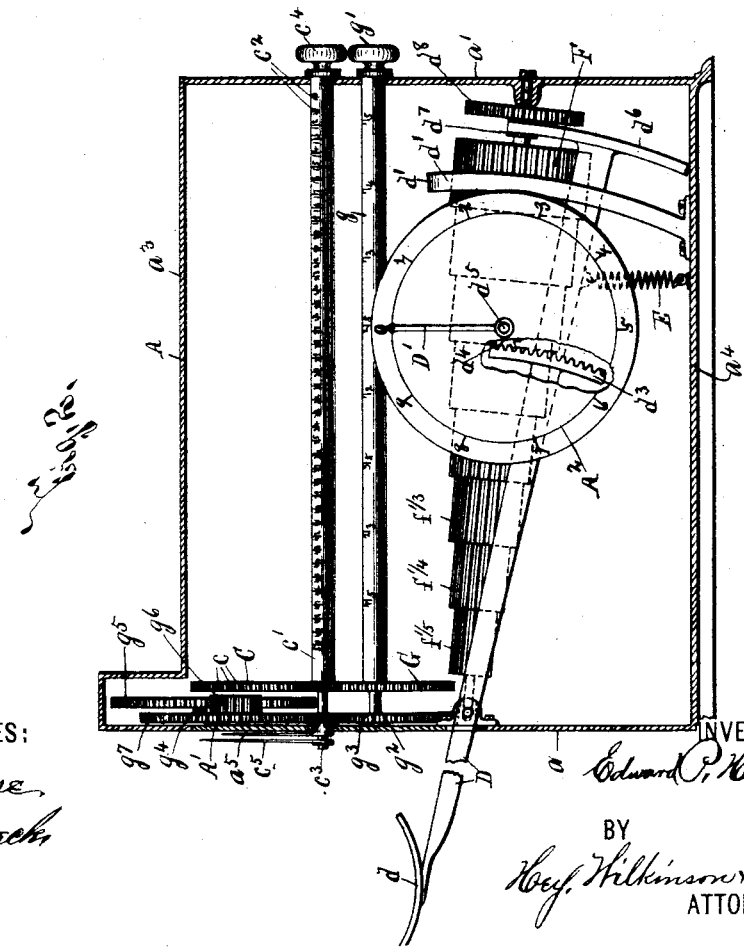
WITNESSES:
H. C. Chase
C. Schoemehr
INVENTOR
Edward P. Herbert.
BY
Hey, Wilkinson & Parsons.
ATTORNEYS

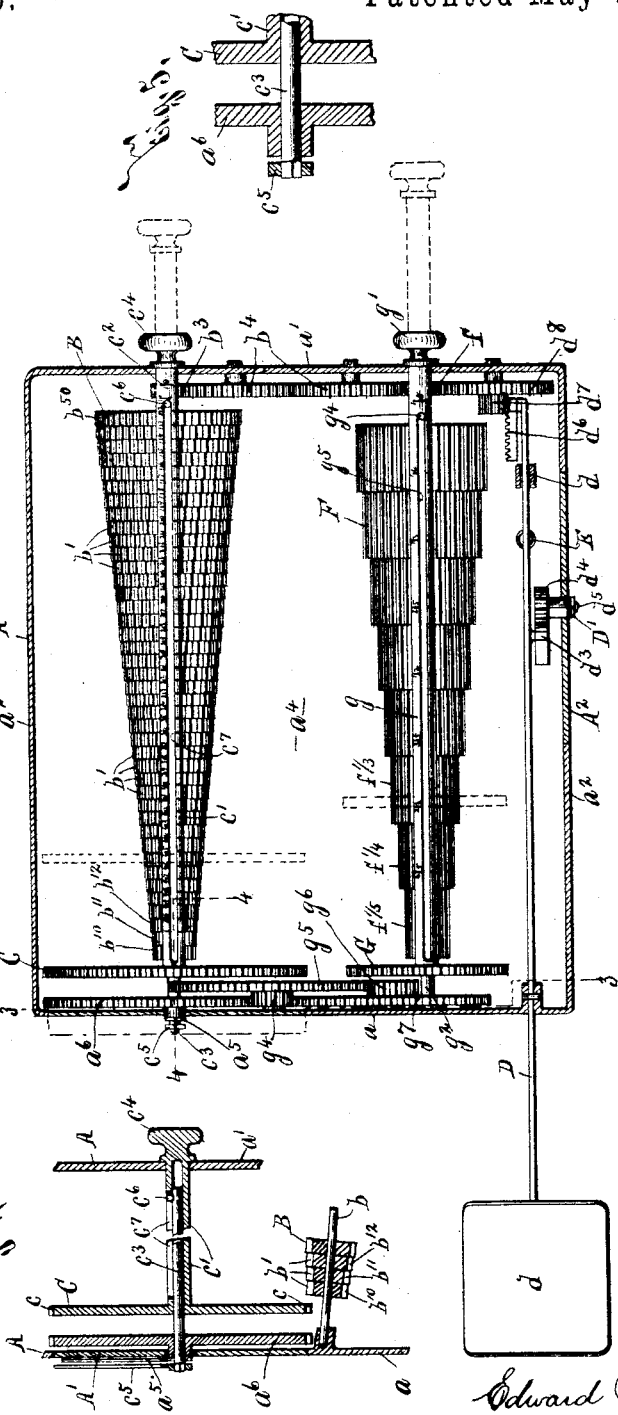

UNITED STATES PATENT OFFICE.

EDWARD P. HERBERT, OF EAST BRIGHTON, NEW YORK.

CALCULATING-SCALE.

SPECIFICATION forming part of Letters Patent No. 538,676, dated May 7, 1895.

Application filed June 19, 1894. Serial No. 515,007. (No model.)

*To all whom it may concern:*

Be it known that I, EDWARD P. HERBERT, of East Brighton, in the county of Monroe, in the State of New York, have invented new and useful Improvements in Calculating-Scales, of which the following, taken in connection with the accompanying drawings, is a full, clear, and exact description.

My invention relates to improvements in calculating scales, and has for its object the production of a simple and efficient device for accurately indicating the weight of a commodity and simultaneously and automatically registering or indicating the value of said commodity at a predetermined price per pound; and to this end it consists, essentially, in the general construction and arrangement of its component parts, all as hereinafter more particularly described and pointed out in the claims.

In describing this invention, reference is had to the accompanying drawings, forming a part of this specification, in which like letters indicate corresponding parts in all the views.

Figure 1 is a top plan view of my invention, the frame being shown in section for illustrating its internal parts, which are shown in their normal position. Fig. 2 is a side elevation, partly in section, of the parts as seen at Fig. 1. Fig. 3 is a cross-sectional view taken on line 3 3, Fig. 1, the reduced ends of the actuating-drums and the pinions provided on their opposite ends being illustrated by full lines, the enlarged ends of the drums being shown by dotted lines, and the intermediate portions of said drums and their shafts being broken away. Fig. 4 is a vertical sectional view taken on line 4 4, Fig. 1; and Fig. 5 is a horizontal detail sectional view of the main indicator, a portion of the shaft and the toothed disk or wheel for rotating said shaft, and a part of the toothed disk or wheel revoluble on said shaft.

The frame A of my calculating scale may be of any desired form, size, and construction for supporting and inclosing its component parts, and preferably consists of front, rear, and side walls, $a$ $a'$, $a^2$ $a^2$, and top and bottom walls $a^3$ $a^4$.

Journaled in the frame A and preferably in the front and rear walls $a$ $a'$ is a shaft $b$ and mounted thereon is a rotary conical actuating drum B provided with a series of contiguous rows of teeth $b^{10}$ $b^{11}$ $b^{12}$, &c., to $b^{50}$ of ununiform number, the normal uppermost tooth of each row being aligned with the corresponding teeth of the next adjacent rows. The drum B may be suitably constructed, but preferably consists of a series of contiguously arranged disks $b'$ of gradually varying diameter, each having its periphery provided with a row of teeth.

Superimposed above and movable along the upper face of the drum B into engagement with the uppermost tooth of each row of teeth thereon is a rotary governing disk or wheel C having a number of peripheral teeth $c$ corresponding to the number of cents in one dollar, viz., one hundred. The disk or wheel C is movable lengthwise of the actuating drum B into engagement with each of the rows of teeth $b^{10}$ $b^{11}$, &c., thereon. This movement of the disk or wheel C is facilitated by the alignment with each other of the uppermost teeth of each of the rows, since the disk or wheel C may be moved from engagement with the uppermost tooth of one row directly into engagement with the corresponding tooth of the next adjacent row.

As previously stated, the rows of teeth $b^{10}$ $b^{11}$, &c., contain ununiform numbers of teeth, but the teeth of each row are so constructed as to freely mesh with the teeth of the governing disk or wheel, and are each arranged to move said disk or wheel a sufficient distance to advance the price indicator a single graduation. Movement of the disk or wheel C is preferably facilitated by a hub $c'$ projecting from one face thereof and provided with graduations $c^2$ corresponding to the rows of teeth $b^{10}$ $b^{11}$, &c., and movable beyond the wall $a'$. The hub $c'$ is feathered on a rotary shaft or rod $c^3$, and is provided at its outer end with a hand engaging piece $c^4$ arranged at the outside of the rear wall $a'$ of the frame A. The shaft or rod $c^3$ is provided at one end with a price indicator $c^5$ movable around a price dial A' supported by the front frame wall $a$ and having graduations corresponding to the number of cents in one dollar, viz., one hundred. A pin or lug $c^6$ projects from the opposite end of the shaft or rod $c^3$ and registers with a slot $c^7$ in the hub $c'$ for limiting the movement of said hub, and insuring simultaneous rotation of the disk or wheel C and the shaft or rod $c^3$.

The row of teeth $b^{10}$ of least diameter upon the actuating drum B contains a number of teeth equal to the smallest predetermined number of cents per pound at which it is intended to sell the commodity, and I have here illustrated said row as formed with ten teeth. The next adjacent row $b^{11}$ contains one additional tooth, and each successive row contains one more tooth than the next adjacent row at one side and one less than the next adjacent row at the other side thereof. The governing toothed disk or wheel C is moved into engagement with any one of the rows of teeth upon the drum B, as previously stated, formed of a number of teeth equaling the number of cents which it is determined to charge per pound for the commodity to be weighed. Consequently, if the drum B is revolved once when the governing toothed disk or wheel C is engaged with the row $b^{10}$ formed of ten teeth, the indicator $c^5$ will be moved along the dial A' until it registers with the graduation 10, and, if the disk or wheel C is engaged with another of the rows of teeth upon the drum B and said drum is revolved once, the indicator $c^5$ will be moved to a graduation of the dial A' representing the same number as the number of teeth in the row engaged by said disk or wheel C.

It is obvious that partial revolutions of the drum B, when the governing disk or wheel C is engaged with different rows of teeth thereon, produce movements of the indicator $c^5$ bearing the same proportion to each other as the movements of said indicator produced by complete revolutions of said rows of teeth. It is also obvious that the actuating drum B may be provided with any desired number of rows of teeth, that any predetermined difference may exist between the number of teeth in each row, and that the rows of the least and the greatest diameter may contain any desired number of teeth.

$d$ is a weight support, which is of any desirable form, size, and construction suitable for holding or engaging the commodity to be weighed, and is connected to the actuating drum B for revolving the same. The support $d$ is preferably mounted on one end of a lever D pivoted to the frame in proximity to its wall $a$ and having its other end movable in a suitable guide $d'$, which is arranged in proximity to the frame wall $a'$, and is formed with a stop shoulder $d^2$ at its upper end for limiting the upward movement of the adjacent end of said lever. A spring E of suitable construction holds the lever D in its normal position for elevating the support $d$, and one end of said spring is secured to the bottom wall $a^4$ of the frame A and its other end to the lever D.

The intermediate portion of the lever D is provided with a rack $d^3$ meshing with a pinion $d^4$ secured to the inner end of a spindle $d^5$ journaled in one of the frame walls $a^2$. The opposite end of the spindle $d^5$ is provided with an indicator D' movable around a weight dial $A^2$ upon the outer face of the adjacent frame wall $a^2$. When the commodity is placed upon the support $d$, the indicator D' is moved around the dial $A^2$, and registers the correct weight of said commodity.

The inner end of the lever D is provided with a rack $d^6$ meshing with a pinion $d^7$ secured to a gear $d^8$ journaled in the rear frame wall $a'$. The gear $d^8$ is connected to a pinion $b^3$ upon the shaft $b$ by intermediate gears $b^4$ $b^4$ journaled in the frame wall $a'$ and a pinion $f$ secured to a shaft $f'$, presently described.

The lever D, spring E, rack $d^6$, pinions $b^7$ $b^3$ $f$, and the gears $d^8$ $b^4$ $b^4$ are so relatively arranged and constructed that a one pound weight, when placed upon the support $d$, rotates the actuating drum B one revolution. Before placing the one pound weight upon its support $d$, the governing toothed disk or wheel C is, as previously described, registered with the row of teeth upon the actuating drum B corresponding to the price per pound thereof, and, when said commodity is placed upon the support $d$, the indicators D' $c^5$ inform the user of the calculating scale of the weight and price of the commodity.

It is frequently desirable to charge a fractional part of a cent per pound for a commodity, and my invention is provided with a second actuating drum F connected to the weight support and formed with a series of rows of teeth $f\frac{1}{5}$, $f\frac{1}{4}$, &c., a governing toothed disk or wheel G movable lengthwise of the drum F, and an indicator $a^5$ movable around the dial A', previously described.

The drum F is mounted on the shaft $f'$, and is also preferably composed of a series of contiguous disks, and the rows of teeth thereof are arranged in the same manner as the teeth of the actuating drum B. The governing toothed disk or wheel G is provided with a graduated hub $g$ and a hand-piece $g'$ similar to the like parts $c^2$ $c^4$ of the toothed disk or wheel C, and the hub $g$ is mounted on a shaft $g^2$ provided at one end with a gear wheel $g^3$ and at its other end with a pin $g^4$ movable in a lengthwise slot $g^5$ in the hub $g$. The indicator $a^5$ is loosely mounted on the shaft $c^3$, previously described, and is provided with a toothed gear $a^6$ connected by gears $g^4$ $g^5$ $g^6$ $g^7$ to the gear $g^3$ upon the shaft $g^2$ movable simultaneously with the governing disk or wheel G. The gears $a^6$ $g^3$ $g^4$ $g^5$ $g^6$ $g^7$ are so relatively proportioned that one complete revolution of the governing disk or wheel G advances the indicator $a^5$ a single graduation. The rows of teeth $f\frac{1}{5}$ $f\frac{1}{4}$, &c., contain numbers of teeth of which the number of teeth in the governing disk or wheel is a common multiple, or form the numerators of a series of fractions of which the number of the teeth of the disk or wheel G is a common denominator. Consequently, it requires several rotations of the actuating drum F to rotate the disk or wheel G when engaged with one of said rows of teeth.

The disk or wheel G is here illustrated as provided with sixty teeth, and the row of teeth $f\frac{1}{5}$ of smallest number as formed with twelve teeth, and consequently it requires five revolutions of the drum F to rotate the disk or wheel G once, when engaged with the row of teeth $f\frac{1}{5}$, and, as previously stated, one revolution of the disk or wheel G advances the indicator $a^5$ a single graduation.

The drum F is connected to the weight support $d$ by any suitable means, as the rack $d^6$, the pinion $d^7$, the gear $d^8$, and the pinion $f$, previously described, and this connecting mechanism is so relatively constructed and arranged that a pound weight upon the support $d$ rotates the drum F once. It thus follows that five rotations of the drum F effected by a five pound weight upon the support $d$ will rotate the toothed disk or gear G a single revolution, and that, as previously described, the indicator $a^5$ will be advanced a single graduation. Consequently, when it is desired to charge one-fifth of a cent per pound for a commodity, the disk or wheel G is registered with the row of teeth $f\frac{1}{5}$ of the actuating drum F. The remaining rows of teeth of the actuating drum F are arranged to produce a single rotation of the wheel G when revolved a certain number of times, and, when it is desired to charge per pound for the commodity a fraction of a cent equal to the fraction produced by dividing the number of teeth of the corresponding row of the actuating drum by the number of the actuating disk or wheel teeth, the governing disk or wheel is registered with the corresponding row of teeth of the actuating drum and the desired movement of the indicator $a^5$ is effected.

My improved calculating scale is thus capable of computing the valuation of commodities at a certain fractional part of a cent per pound, and, when the price of the commodity is a certain number of cents and an additional fractional part of a cent per pound, the amounts registered by the indicators $c^5$ $a^5$ are added together.

The operation of my invention will be readily perceived upon reference to the foregoing description and the accompanying drawings, and it is apparent that, when a commodity is placed upon the support $d$, its weight is determined by the indicator D′ and its price by either or both of the indicators $c^5$ $a^5$, and that the movement of said indicators is governed by the toothed disks or wheels C G, which are adjustable to the desired position corresponding to the predetermined price of the commodity, and are revolved by the actuating drums engaged therewith.

It is evident that the exact detail construction and arrangement of the parts of my invention may be considerably varied without departing from the spirit thereof, and that, if desired, the parts may be relatively proportioned for computing the price in accordance with the coin of foreign countries.

Having thus fully described my invention, what I claim as new, and desire to secure by Letters Patent, is—

1. In a calculating scale, the combination of an indicator, an actuating drum provided with a series of contiguous rows of teeth of ununiform number, a governing toothed disk or wheel connected to said indicator and movable into engagement with the rows of teeth, a pinion connected to the actuating drum for revolving the same, and a weight support connected to the pinion for actuating the same, substantially as described.

2. In a calculating scale, the combination of an indicator, an actuating drum provided with a series of contiguous rows of teeth of ununiform number, a governing toothed disk or wheel connected to said indicator and movable into engagement with the rows of teeth, a pinion connected to the actuating drum for revolving the same, a pivoted lever provided at one end with a weight support and at its other end with a rack engaging the pinion for actuating the same, substantially as described.

3. In a calculating scale, the combination of an indicator, an actuating drum provided with a series of contiguous rows of teeth of ununiform number, a governing toothed disk or wheel connected to said indicator and movable into engagement with the rows of teeth, a weight support connected to the actuating drum for operating the same, and a second indicator connected to the weight support, substantially as specified.

4. In a calculating scale, the combination of an indicator, an actuating drum provided with a series of contiguous rows of teeth of ununiform number, a governing toothed disk or wheel connected to said indicator and movable into engagement with the rows of teeth, a pinion connected to the actuating drum for revolving the same, a pivoted lever provided at one end with a weight support and at its other end with a rack engaging the pinion for actuating the same and provided also with a second rack, and a second indicator connected to the latter rack, substantially as described.

5. In a calculating scale, the combination of an indicator, an actuating drum provided with a series of contiguous rows of teeth of ununiform number, a governing toothed disk or wheel movable into engagement with the rows of teeth, and connected mechanism between the indicator and the governing wheel for revolving the indicator at a different speed than the governing disk or wheel, substantially as and for the purpose described.

6. In a calculating scale, the combination of an indicator, an actuating drum provided with a series of contiguous rows of teeth of ununiform number, a governing toothed disk or wheel movable into engagement with the rows of teeth, connected mechanism between the indicator and the governing wheel for revolving the indicator at a different speed than the governing disk or wheel, a pinion connected to the actuating drum for revolving the same, and a weight support connected to the pinion for actuating the same, substantially as specified.

7. In a calculating scale, the combination of an indicator, an actuating drum provided with a series of contiguous rows of teeth of ununiform number, a governing toothed disk or wheel movable into engagement with the rows of teeth, connected mechanism between the indicator and the governing wheel for revolving the indicator at a different speed than the governing disk or wheel, a weight support connected to the actuating drum for operating the same, and a second indicator connected to the weight support, substantially as set forth.

8. In a calculating scale, the combination of a pair of indicators, a pair of actuating drums, each provided with a series of contiguous rows of teeth of ununiform number, a governing toothed disk or wheel connected to one of the indicators and movable into engagement with the rows of teeth of one of the actuating drums, a second governing wheel movable into engagement with the rows of teeth of the other actuating drum, and connected mechanism between the other indicator and the governing wheel for revolving said indicator at a different speed than the latter governing disk or wheel, substantially as described.

9. In a calculating scale, the combination of a pair of indicators, a pair of actuating drums, each provided with a series of contiguous rows of teeth of ununiform number, a governing toothed disk or wheel connected to one of the indicators and movable into engagement with the rows of teeth of one of the actuating drums, a second governing wheel movable into engagement with the rows of teeth of the other actuating drum, connected mechanism between the other indicator and the governing wheel for revolving said indicator at a different speed than the latter governing disk or wheel, pinions connected to the actuating wheel, pinions connected to the actuating drums for revolving the same, and a weight support connected to the pinions for actuating the same, substantially as specified.

10. In a calculating scale, the combination of an indicator, a shaft for revolving the indicator provided with a pin or lug, an actuating drum provided with a series of contiguous rows of teeth of ununiform diameter, a governing toothed disk or wheel mounted on said shaft and movable into engagement with the rows of teeth, said disk or wheel being movable lengthwise of the shaft and being provided with a projecting hub encircling said shaft and having a lengthwise slot therein for receiving the pin or lug of the shaft, a hand engaging piece provided on the extremity of said hub for moving the disk or wheel longitudinally along said shaft, a second indicator loosely mounted on said shaft, a second actuating drum provided with a series of contiguous rows of teeth of ununiform number, and a second governing wheel movable into engagement with the rows of teeth of the second actuating drum and connected to the second indicator for actuating the same, substantially as and for the purpose described.

11. In a calculating scale, the combination of an indicator a shaft for revolving the indicator provided with a pin or lug, an actuating drum provided with a series of contiguous rows of teeth of ununiform diameter, a governing toothed disk or wheel mounted on said shaft and movable into engagement with the rows of teeth, said disk or wheel being movable lengthwise of the shaft and being provided with a projecting hub encircling said shaft and having a lengthwise slot therein for receiving the pin or lug of the shaft, a hand engaging piece provided on the extremity of said hub for moving the disk or wheel longitudinally along said shaft, a second indicator loosely mounted on said shaft, a second actuating drum provided with a series of contiguous rows of teeth of ununiform number, a second governing wheel movable into engagement with the rows of teeth of the second actuating drum and connected to the second indicator for actuating the same, pinions connected to the actuating drums for revolving the same, and a weight support connected to the pinions for actuating the same, substantially as set forth.

In testimony whereof I have hereunto signed my name, in the presence of two attesting witnesses, at Syracuse, in the county of Onondaga, in the State of New York, this 9th day of May, 1894.

EDWARD P. HERBERT.

Witnesses:
CLARK H. NORTON,
E. A. WEISBURG.